(12) United States Patent
Patel et al.

(10) Patent No.: US 7,342,056 B2
(45) Date of Patent: Mar. 11, 2008

(54) PAVEMENT MARKING COMPRISING MODIFIED ISOCYANATE

(75) Inventors: Suman K. Patel, Woodbury, MN (US); James G. Carlson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 526 days.

(21) Appl. No.: 10/870,396

(22) Filed: Jun. 17, 2004

(65) Prior Publication Data

US 2005/0282933 A1 Dec. 22, 2005

(51) Int. Cl.
*F21V 7/22* (2006.01)
(52) U.S. Cl. .................. 523/172; 523/219; 524/589
(58) Field of Classification Search .............. 523/172, 523/219; 524/589
See application file for complete search history.

(56) References Cited

U.S. PATENT DOCUMENTS

| | | | |
|---|---|---|---|
| 3,436,359 A | 4/1969 | Hubin et al. | |
| 4,705,814 A | 11/1987 | Grigsby, Jr. et al. | |
| 4,732,919 A | 3/1988 | Grigsby, Jr. et al. | |
| 5,013,813 A | 5/1991 | Zimmerman et al. | |
| 5,126,170 A | 6/1992 | Zwiener et al. | |
| 5,140,090 A | 8/1992 | Champion et al. | |
| 5,162,388 A | 11/1992 | Primeaux, II | |
| 5,171,818 A | 12/1992 | Wilson | |
| 5,266,671 A | 11/1993 | Primeaux, II | |
| 5,317,076 A | 5/1994 | Primeaux, II | |
| 5,442,034 A | 8/1995 | Primeaux, II | |
| 5,478,596 A | 12/1995 | Gurney | |
| 5,480,955 A | 1/1996 | Primeaux, II | |
| 5,504,181 A | 4/1996 | Primeaux, II | |
| 5,527,853 A | 6/1996 | Landy et al. | |
| 5,616,677 A | 4/1997 | Primeaux | |
| 6,005,062 A * | 12/1999 | Hansen et al. ........... | 528/68 |
| 6,013,755 A | 1/2000 | Primeaux, II et al. | |
| 6,166,106 A | 12/2000 | Purgett et al. | |
| 6,350,823 B1 | 2/2002 | Goeb et al. | |
| 2003/0105220 A1 | 6/2003 | Gupta et al. | |
| 2004/0067315 A1 | 4/2004 | Niesten et al. | |

FOREIGN PATENT DOCUMENTS

| | | |
|---|---|---|
| EP | 0 667 362 A1 | 8/1995 |
| GB | 2 113 234 A | 8/1983 |
| JP | 7188583 A | 7/1995 |
| JP | 1998087778 | 4/1998 |
| JP | 1998095826 | 4/1998 |
| WO | WO 98/01237 | 1/1998 |

OTHER PUBLICATIONS

D.J. Primeaux II, "Spray Polyurea Versatile High Performance Elastomer for the Polyurethane Industry", presented at the 32nd Annual Polyurethane Technical/Marketing Conference, Oct. 1-4, 1989.
D.J. Primeaux II, "Spray Polyurea Elastomers Offer Performance Advantages", *Modern Pain and Coatings*, 1-6 (Jun. 1991).
D.J. Primeaux II, "100% Solids Aliphatic Spray Polyurea Elasomer Systems", *J. Elastomers Plastics*, 24, 323-336 (Oct. 1992).
Polyurethanes World Congress 1991, The Voice of Advancement; 100% Solids Aliphatic Spray Polyurea Elastomer Systems, Sep. 24-26, 1991, pp. 473-477.
Analytical & Properties Research Laboratory Commercial Products Analysis Group, Feb. 3, 1997, 3 pages.
Applications of Polyasparatic Esters in Polyurea Coatings, S. Luthra et al., pp. 398-419, Feb. 1994.
K.-F Torges et al., "Cast Polyurea Elastomers: Application, Processing and Performance", presented at Utech '94, Paper #42, pp. 1-8 (1994).
EnDiSys 2K Detail Rig (2K13D1), Sep. 24, 2002.
3M Stamark™ Liquid Pavement Marking Series 1200, Product Bulletin 1200, Mar. 2004.

* cited by examiner

*Primary Examiner*—Edward J. Cain
(74) *Attorney, Agent, or Firm*—Carolyn A. Fischer (57) ABSTRACT

Composition useful for pavement markings comprising a binder and material selected from the group of fillers, extenders, pigments and combinations thereof; and retroreflective elements. The binder comprising a first component comprising the reaction product of an excess of at least one polyisocyanate and at least one hydroxy group-containing material, and a second component comprising at least one polyamine.

25 Claims, 2 Drawing Sheets

PAVEMENT MARKING COMPRISING MODIFIED ISOCYANATE

BACKGROUND

U.S. Pat. No. 6,166,106 describes liquid pavement marking compositions, methods of applying, and pavement markings produced therefrom. The composition is a two-part coating composition having an amine component including one or more aspartic ester amines and optionally one or more amine-functional coreactants, an isocyanate component including one or more polyisocyanates, and material selected from the group of fillers, extenders, pigments, and combinations thereof.

Although various liquid pavement marking compositions are known, industry would find advantage in compositions having improved properties.

SUMMARY

In one embodiment, the invention describes a pavement marking composition comprising a binder, material selected from the group of fillers, extenders, pigments and combinations thereof; and retroreflective elements. The binder comprises a first component comprising the reaction product of an excess of at least one polyisocyanate and at least one hydroxy group-containing material, and a second component comprising at least one polyamine. Such reaction product is also referred to herein as a "modified isocyanate". The binder (i.e. in combination with the material selected from the group of fillers, extenders, and pigments) advantageously exhibits good adhesion to oil contaminated surfaces. Further, the binder exhibits a low level of shrinkage (e.g. less than 5%).

In other embodiments, the invention relates to a traffic-bearing surface and a preformed pavement marking tape comprising such pavement marking compositions.

In another embodiment, the invention describes a method of marking a traffic-bearing surface comprising providing each of the two-components of the binder just described wherein at least one component comprises material selected from the group of fillers, extenders, pigments and combinations thereof; combining the first component and second component; spraying the binder onto a traffic bearing surface; and optionally applying retroreflective elements to the binder.

In yet another embodiment, the invention describes a coating composition comprising:

a binder comprising
a first component comprising the reaction product of an excess of at least one polyisocyanate and at least one hydroxy group-containing material, and
a second component comprising at least one polyamine;

and about 10 wt-% to about 70 wt-% of material selected from the group of fillers, extenders, pigments and combinations thereof.

In each of the embodiments just described the hydroxy group-containing material may comprise at least 3 carbon atoms and preferably at least 6 carbon atoms for each oxygen atom. Polyester polyols prepared from dimer acid, dimer diol, and mixtures thereof may usefully be employed. The hydroxy group-containing material typically comprises a number average molecular weight of at least 300 g/mole. The first component typically comprises about 5 wt-% to about 50 wt-% of the modified polyisocyanate with the remainder of the first component comprising excess isocyanate. The polyisocyanate may be a polyisocyanurate. The polyamine is typically a secondary amine such as an aspartic ester amine. The first component and second component are typically reacted at a stoichiometric ratio of about 1:1. The binder typically comprises at least about 15 wt-% (e.g. at least 30 wt-%, at least about 45 wt-%) of material selected from the group of fillers, extenders, pigments. Hollow glass microspheres are an exemplary filler. Preferred retroreflective elements include ceramic microspheres, ceramic reflective elements, and combinations thereof. The binder and thus marking is preferably substantially free of volatile organic components.

DETAILED DESCRIPTION

The pavement marking compositions of the present invention comprise a binder preparable from a two-part system that includes a first component comprising at least one polyamine and a second component comprising at least one polyisocyanate. As used herein "modified isocyanate" refers to the reaction product of an excess of at least one polyisocyanate with at least one hydroxy group-containing material. Although, the isocyanate component may consist solely of this modified isocyanate, typically the isocyanate component comprises about 5 wt-% to about 50 wt-% of such modified isocyanate with the remainder of the isocyanate component being excess unreacted isocyanate. After application and curing, the pavement marking comprises the reaction product of such first and second components. The reacted binder comprises urea groups (—NR—C(O)—NR—). Polymers containing urea groups are often referred to as polyureas.

In some preferred embodiments the reacted binder comprises isocyanurate groups as depicted in the following Formula I:

Formula I

However, the reacted binder may comprise other groups, such as biuret groups (—NR—C(O)—NR—C(O)—NR—), urethane groups (—NR—C(O)—O—), and the like, wherein R is independently hydrogen or an organic group.

A variety of polyisocyanates may be utilized in preparing the modified isocyanate of the second component of the binder of the invention. "Polyisocyanate" means any organic compound that has two or more reactive isocyanate (—NCO) groups in a single molecule such as diisocyanates, triisocyanates, tetraisocyanates, etc., and mixtures thereof. Cyclic and/or linear polyisocyanate molecules may usefully be employed. For improved weathering and diminished yellowing the polyisocyanate(s) of the isocyanate component is typically aliphatic.

Useful aliphatic polyisocyanates include, for example, bis(4-isocyanatocyclohexyl) methane ($H_{12}$ MDI) such as available from Bayer Corp., Pittsburgh, Pa. under the trade designation "Desmodur W"; isophorone diisocyanate (IPDI) such as commercially available from Huels America, Piscataway, N.J.; hexamethylene diisocyanate (HDI) such as commercially available from Aldrich Chemical Co., Milwaukee, Wis.; trimethyl hexamethylene diisocyanate such as commercially available from Degussa, Corp., Dusseldorf, Germany under the trade designation "Vestanate TMDI"; and m-tetramethylxylene diisocyanate (TMXDI) such as commercially available from Aldrich Chemical Co., Milwaukee, Wis. Although typically less preferred, aromatic isocyanates such as diphenylmethane diisocyanate (MDI) such as commercially available from Bayer Corp., Pittsburgh, Pa. under the trade designation "Mondur M"; toluene 2,4-diisocyanate (TDI) such as commercially available from Aldrich Chemical Co., Milwaukee, Wis., and 1,4-phenylene diisocyanate are also useful.

Preferred polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp. under the trade designation "Desmodur N-100", polyisocyanates containing isocyanurate groups, such as that available from Bayer Corp. under trade designation "Desmodur N-3300", as well as polyisocyanates containing urethane groups, uretdione groups, carbodiimide groups, allophonate groups, and the like. These derivatives are preferred as they are polymeric, exhibit very low vapor pressures and are substantially free of isocyanate monomer.

The pre-reaction of the polyisocyanate with hydroxy group-containing material results in the modified polyisocyanate having a higher molecular weight and lower isocyanate content than the polyisocyanate alone. This will often lead to a higher viscosity in the modified polyisocyanate. It is preferred that the modified polyisocyanate is sufficiently low in viscosity such that it is amenable to spraying. Typically, the Brookfield viscosity of each component is less than about 10,000 cps, preferably less than 5,000 cps, and more preferably less than 4,000 cps at temperatures ranging from 25° C. to 70° C. Exemplary polyisocyanates for preparing the modified polyisocyanates of the invention include a polyisocyanate commercially available from Rhodia Corp., Cranbury, N.J. under the trade designation "Tolonate HDT-LV" and from Bayer Corp. under the tradename "Desmodur N-3600". These commercial products have a viscosity of about 1100 cps at 25° C. and modified polyisocyanates prepared from them typically have a viscosity of about 1200 to about 10,000 cps at 25° C. Further exemplary polyisocyanates include "Desmodur N-3300" or "Desmodur N-100" even though these materials result in higher viscosity modified polyisocyanates. The viscosity of either component may be reduced by heating the component up to about 70° C. in order to improve the ability to spray the component.

Although the hydroxyl group-containing material is typically a polyol comprising two or more hydroxyl groups, material comprising a single hydroxyl group may be employed alone or in combination with a polyol. A variety of polyols can be utilized in the preparation of the modified isocyanate component. Suitable polyols include polyester polyols, polyether polyols, polydiene polyols, hydrogenated polydiene polyols, polycarbonate polyols, and hydrocarbon polyols. Although the polyol may contain more than two hydroxyl groups, in at least some embodiments, the polyol is preferably difunctional.

One preferred class of polyols are polyester polyols prepared from dimer acid. Dimer acid is the product of dimerization of an 18 carbon unsaturated fatty acid resulting in a 36 carbon diacid product. Typically a mixture of unsaturated acids are dimerized resulting in a mixture of 36 carbon diacids. Preferred dimer acid based polyols are hydrogenated resulting in low color. Several polyester polyols prepared from dimer acid are commercially available from Uniqema Corporation, New Castle, Del. under the trade designation "Priplast".

Dimer diol is obtained by reduction of the carboxylic acids and residual unsaturation of dimer acid, providing a 36 carbon hydrocarbon diol. Dimer diol is commercially available from Uniqema Corporation under the trade designation "Pripol 2033".

In order to improve the performance of the marking for extended durations of time when applied to oil contaminated surfaces, it is preferred that the hydroxy group-containing material (e.g. polyol or diol) is hydrophobic. The ratio of carbon atoms to oxygen atoms of a hydroxy group-containing material molecule is one way of characterizing the hydrophobicity of a hydroxy group-containing material. For example, a polyol such as polycaprolactone, having about 3 carbon atoms for each oxygen or other heteroatom present in the polyol molecule is considered herein to have a relatively low level of hydrophobicity. Although modified isocyanates prepared from the reaction of a polyisocyanate with a hydroxy group-containing material having a low levels of hydrophobicity provides a pavement marking having a low shrinkage, it has been found that it is preferred to employ a hydroxy group-containing material having at least about 6 carbon atoms for each oxygen or other heteroatom present in the hydroxy group-containing material molecule. For example, polyols prepared from hydrogenated dimer acid often have at least 9 carbon atoms for each oxygen or other heteroatom present in the polyol molecule; whereas polyols prepared from dimer diol often have at least about 18 carbon atoms for each oxygen or other heteroatom. It is surmised that even better performance on oil contaminated surfaces can be attained by selection of a hydroxy group-containing material having an even higher ratios of carbon atoms to oxygen or other heteroatom of the polyol molecule (e.g. 30 to 40 for each oxygen or other heteroatom). For example, (e.g. hydrogenated) polybutadiene polyols, such as commercially available from Sartomer Corporation, Exton, Pa. under the trade designations "Poly bd" and "Krasol" have 50 to 100 carbon atoms for each oxygen or other heteroatom present in the polyol molecule.

The number average molecular weight of the hydroxy group-containing material (e.g. polyol) is preferably greater than about 300 g/mole. Further the number average molecular weight of the hydroxy group-containing material is typically less than 15,000 g/mole. The molecular weight and hydroxyl content of the hydroxy group-containing material may be chosen to give a modified polyisocyanate of a desired isocyanate and urethane group content. This affects, for example, viscosity, shrinkage, mechanical properties and the volume of amine component required in the curing process. Typically hydroxy group-containing materials in a molecular weight (Mn) range of about 500 g/mole to about 5000 g/mole are preferred, and those having a molecular weight of about 750 g/mole to 3000 g/mole are more preferred, primarily due to viscosity considerations as previously described.

In preparation of the modified isocyanate, an isocyanate component comprising at least one polyisocyanate is reacted with a hydroxyl functional component comprising at least one hydroxy group-containing material (e.g. polyol, diol) at a stoichiometric excess of isocyanate. Conditions are chosen so that all of the available hydroxyl groups of the hydroxy group-containing material are reacted in preparing the modified polyisocyanate, so that the modified polyisocyanate contains both urethane groups and unreacted isocyanate groups.

Depending on the polyisocyanate and hydroxy group-containing material selected, the ratio of isocyanate groups to hydroxyl groups may range from about 2:1 to about 150:1, preferably from about 5:1 to about 25:1. For example, a diisocyanate and diol may be reacted at a ratio of about 10:1. In at least some embodiments, a triisocyanate and diol are reacted at a ratio of at least about three isocyanate groups to one hydroxyl group, preferably at least about 5 isocyanate groups to one hydroxyl group and most preferably at least about 9 isocyanate groups per hydroxyl group. It is often preferred to choose a hydroxy group-containing material of molecular weight such that the above conditions are met and that the amount of hydroxy group-containing material present in the polyisocyanate component is at least 5 wt-% and preferably at least 10 wt-%. Further, the amount of hydroxy group-containing material of the isocyanate component is typically no more than about 50 wt-% and preferably no more than about 30 wt-%. The excess unreacted isocyanate serves as a diluent for the modified isocyantate thus formed.

The modified isocyanate is prepared beforehand by being pre-reacted prior to being combined with the amine component. If the polyisocyanate, hydroxy group-containing material, and amine were simply combined without first pre-reacting the polyisocyanate with the hydroxy group-containing material (e.g. polyol, doil)), the reaction between the hydroxy group-containing material and the polyisocyanate would be appreciably slower than the reaction between the polyamine and the polyisocyanate. Slow reaction times could result in extended track free times and thus are typically not suitable for pavement marking uses.

The amine component includes at least one polyamine. As used herein polyamine refers to compounds having at least two amine groups each containing at least one active hydrogen (N—H group) selected from primary amine or secondary amine. The amine component preferably comprises and may consist solely of aliphatic polyamine(s). In order to obtain the preferred reaction rate, the amine component preferably includes and may consist solely of one or more secondary amines, such as an aspartic ester amine.

Preferred aspartic ester amines have the following Formula II

Formula II wherein $R^1$ is a divalent organic group (preferably, having 1-40 carbon atoms), and each $R^2$ is independently an organic group inert toward isocyanate groups at temperatures of 100° C. or less.

In the above formula, preferably, $R^1$ is an aliphatic group (preferably, having 1-40 carbon atoms), which can be branched, unbranched, or cyclic, and more preferably, $R^1$ is selected from the group of divalent hydrocarbon groups obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane or 3,3-dimethyl-4,4'-diamino-dicyclohexyl methane. Divalent groups obtained by the removal of the amino groups from relatively high molecular weight polyether polyamines such as the products marketed under the trade designation "Jeffamine" by Huntsman LLC, Houston, Tex., and amine terminated butadiene-acrylonitrile polymers sold under the tradename "HYCAR" by Noveon Corp., Cleveland, Ohio, are also suitable. Other suitable polyamine precursors include ethylene diamine, 1,2-diaminopropane, 2,5-diamino-2,5-dimethylhexane, 1,11-diaminoundecane, 1,12-diaminododecane, 2,4- and/or 2,6-hexahydrotoluylene diamine, and 2,4'-diamino-dicyclohexyl methane. Aromatic polyamines such as 2,4- and/or 2,6-diaminotoluene and 2,4'- and/or 4,4'-diaminodiphenyl methane are also suitable but less preferred.

In the above formula, preferably, each $R^2$ is independently an organic group having 1-40 carbon atoms, more preferably, each $R^2$ is independently an alkyl group (preferably, having 1-20 carbons), which may be branched or unbranched, and most preferably, each $R^2$ is independently a lower alkyl group (having 1-4 carbon atoms).

Suitable aspartic ester amines are commercially available from Bayer Corp. under the trade designations "Desmophen NH 1420", "Desmophen NH 1521" and "Desmophen NH 1220".

Desmophen NH 1420 is substantially composed of the following compound Formula III;

Formula III

Desmophen NH1521 is substantially composed of the following compound Formula IV;

Formula IV

Desmophen NH 1220 is substantially composed of the following compound Formula V;

Formula V wherein in each of Formulas III-V, Et is ethyl.

In some embodiments it is preferred to employ one or more amine-functional coreactants in addition to the aspartic ester amines. These amines (other than aspartic ester amines) typically function as chain extenders and/or impact modifiers. The use of such amine-functional coreactant(s) can contribute to the presence of soft segments in the polymer backbone for improved toughness properties. Such amine-functional coreactants can be primary amines, secondary amines, or combinations thereof. Secondary amines, a blend of secondary amines, or a blend of secondary amines and primary amines are often preferred.

The amine-functional coreactant is preferably an amine-terminated polymer. Examples of such polymers include, but are not limited to, those available from Huntsman Chemical, under the trade designation "Jeffamine" polypropylene glycol diamines such as "Jeffamine XTJ-510", those available from Noveon Corp., Cleveland, Ohio, under the trade designation "HYCAR" ATBN (amine-terminated acrylonitrile butadiene copolymers), and those disclosed in U.S. Pat. No. 3,436,359 (Hubin et al.) and U.S. Pat. No. 4,833,213 (Leir et al.) (amine-terminated polyethers, and especially polytetrahydrofuran diamines). Other aliphatic diamines that may be useful include for example lower reactivity diamines such as commercially available from UOP, Des Plaines, Ill. under the trade designation "Clearlink 1000 Diamine" and a cycloaliphatic bis(secondary amine) such as commercially available from Huntsman, Houston, Tex. under the trade designation "Jefflink 754 Diamine".

The stoichiometry of the polyurea reaction is based on a ratio of equivalents of isocyanate (e.g. modified isocyanate and excess isocyanate) of the first component to equivalents of amine of the second component. The first and second component are reacted at a stoichimetric ration of about 1:1. Preferably, the isocyanate is employed in slight excess. More preferably, the isocyanate:amine ratio is less than about 1.15:1. Even more preferably, the isocyanate:amine ratio is less than about 1.1:1. Most preferably, the isocyanate:amine ratio is less than about 1.05:1. The lower ratios of isocyanate to amine can potentially lead to the formation of a looser polymer network and increased viscoelastic damping in the cured coating.

To achieve desired stoichiometries, the amine and isocyanate components are combined in a volume ratio of preferably about 5:1 to about 1:5 amine to isocyanate components. More preferably, the ratio is within a range of about 1:1 to 3:1 amine to isocyanate components. Particularly preferred ratios are 2:1 and 3:1 amine to isocyanate components.

At least one of the components, and thus the reacted binder, generally comprise one or more materials such as pigments, fillers, extenders, and combinations thereof. The pigments, fillers, and extenders contribute to the desired properties of the uncured and cured composition such as cured film density, film cure profile, track-free time, cured film modulus, coating adhesion to a substrate, response to thermal cycling, shrinkage of polymer components, abrasion, toughness, and coating durability. Whereas pigments and fillers are non-soluble, solid material, extenders are typically soluble with the binder components. Typically the cured pavement marking comprises at least about 5 wt-% non-soluble materials. More typically the cured pavement marking comprises at least about 15 wt-% and more typically at least about 20 wt-% non-soluble materials. Even more typically the cured pavement marking comprises at least about 30 wt-% non-soluble materials. Yet even more typically the cured pavement marking comprises at least about 45 wt-% non-soluble materials. Pigments are insoluble, solid light scattering materials that impart desired visual appearance properties such as color and opacity in the daytime and contribute to retroreflective performance of the marking at night. The reflection of the binder comprising one or more light scattering materials can conveniently be characterized as described in ANSI Standard PH2.17-1985. The value measured is the reflectance factor that compares the diffuse reflection from a sample, at specific angles, to that from a standard calibrated to a perfect diffuse reflecting material. For pavement markings that employ a diffusely reflecting binder, the reflectance factor of the binder is typically at least 75% at a thickness of 500 micrometers for adequate brightness for highway markings. More typically, the binder has a reflectance factor of at least 85% at a thickness of 500 micrometers.

Diffuse reflection is caused by light scattering within the binder. The degree of light scattering is generally due to a difference in the refractive index of the scattering phase in comparison to the base composition of the binder. An increase in light scattering is observed typically when the difference in refractive index is greater than about 0.1. Typically, the refractive index difference is greater than about 0.4. (e.g. greater than 0.5, 0.6, 0.7 and 0.8).

The binder typically comprises diffusely reflecting pigment particles and/or at least one specularly reflecting pigment particles (e.g. aluminum flake, pearlescent pigment). For embodiments wherein the binder lacks filler, the amount of pigment equal the amount of non-soluble material as just described. Examples of useful diffuse pigments include, but are not limited to, titanium dioxide, zinc oxide, zinc sulfide, lithophone, zirconium silicate, zirconium oxide, natural and synthetic barium sulfates, and combinations thereof. An example of a useful specular pigment is a pearlescent pigment, such as pearlescent pigments commercially available from EM Industries, Inc., Hawthorne, N.Y. under the trade designations "Afflair 9103" and "Afflair 9119" and commercially available from The EM Industries of Hawthorne, N.Y. under the trade designations "Mearlin Fine Pearl #139V" and "Bright Silver #139Z". Other pigments may be added to the binder to produce a colored pavement marking. In particular yellow, is a desirable color for pavement markings. In order to maximize the reflectance of the marking, particularly in combination with transparent microspheres, it is preferred to maximize the concentration of pigment provided that coating viscosity, and cured binder physical properties are not compromised. Typically, the maximum amount of pigment is about 40 to 45 wt-% of the total binder concentration.

A filler is a solid, insoluble material often employed to add bulk volume or to extend the pigments capabilities without impairing the reactive chemistry of the coating mixture. Unlike pigments that have desirable optical properties and are often relatively expensive, fillers typically do not possess such optical properties and are generally less expensive than pigments. Many fillers are natural minerals such as talc, clay, calcium carbonate, kaolin, whiting, and silica. Other exemplary fillers includes ceramic microspheres, hollow polymeric microspheres such as those available from Akzo Nobel, Duluth, Ga. under the trade designation "Expancel 551 DE"), and hollow glass microspheres (such as those commercially available from 3M Company, St. Paul, Minn. under the trade designation "K37".

A particularly preferred type of filler is hollow glass microspheres. Hollow glass microspheres are particularly advantageous because they demonstrate excellent thermal stability and a minimal impact on dispersion viscosity and density. They also are rapidly and easily dispersed with low shear mixing and demonstrate relatively little equipment abrasion. Preferably, the microspheres are incorporated into the amine component for enhanced storage stability. In at least some embodiments it is preferred that the cured pavement marking comprises at least about 30 volume percent, and often at least about 40 volume percent of hollow glass microspheres. Glass microsphere fillers are differentiated from glass microsphere retroreflective elements in view of their size (typically smaller), low durability (e.g. hollow), and their inability to impart the subsequently described retroreflective properties.

The pavement marking compositions typically comprise various additives as are known in the art. For example, weathering additives such as ultraviolet absorbers, hindered amine light stabilizers, antioxidants, dispersing and grinding aids, water scavengers, surfactants, leveling agents wetting agents, impact modifiers (e.g., rubber tougheners such as those commercially available from Rohm and Haas under the trade designations "Paraloid 2691" and "EXL-2330", defoamers, suspension stabilizers, biocides, etc., can be added to the binder to improve the manufacturability, the properties during application and/or the overall durability of markings of the present invention. Significantly, however, no catalysts are needed to achieve desirable track-free times.

The polyamine component and the modified isocyanate component are combined and reacted such that the reaction mixture is highly crosslinked. One way of determining the extent of crosslinking is to measure the amount of components of the cured composition that are soluble in methyl ethyl ketone (MEK) after immersion in such solvent for one week. Highly crosslinked compositions typically have less than 10 wt-% solubles in MEK. In at least some embodiments the cured pavement marking compositions of in the invention have less than 5 wt-% or less than 3 wt-% soluble components.

The binder (e.g. polyamine, polyisocyanate, hydroxy group-containing material) components are chosen such that the resulting pavement marking is generally outdoor durable and resistant to vehicular stresses. In the absence of retroreflective elements, the pavement marking has good daytime visibility due to the inclusion of pigments and optional colorant in the binder. When the binder is combined with retroreflective elements (i.e. retroreflective elements), the pavement marking provides good nighttime visibility as well.

The pavement marking (i.e. the binder and components such as pigment and filler combined with the binder components prior to application) of the invention exhibits good adhesion to a wide variety of substrates and surfaces, including concrete and asphalt. An advantage of the use of a modified isocyanate in at least some embodiments, is good performance when applied to oil contaminated surfaces. As used herein, "good adhesion to oil contaminated surfaces" refers to substantially no delamination of the marking from the oil contaminated surface after 24 hours according to the test method described in the examples. Curling or lifting of an edge portion of a marking is an indication of delamination. In preferred embodiments, the markings of the invention exhibits good adhesion to oil contaminated surfaces after 192 hours, 696 hours, 1824 hours, as well as any time interval between. The test method utilized herein is an accelerated aging test and thus the actual product life of the pavement marking is substantially longer than the durations of time tested.

The inclusion of a modified isocyanate also contributes to reduced shrinkage, as evaluated according to the test method described in the forthcoming examples. In preferred embodiments, the pavement marking compositions of the invention exhibits shrinkage of less than about 2.5% after 2 weeks conditioning in a 150° F. (65.6° C.) oven (without the additional of moisture). Preferably, the shrinkage does not substantially change after conditioning in a 150° F. (65.6° C.) oven after extended durations of time and thus continues to be less than about 2.5% at 2, 3, 4 weeks, and longer (e.g. 2 years) as well as at any interval between.

Another characteristic of the pavement markings described herein is a glass transition temperature Tg near 50° C. as determined by Dynamic Mechanical Analysis. Further the pavement marking compositions exhibits less than about 5% swelling when immersed in water at ambient temperature for one week. Preferably the amount of swelling is less than about 4% and less than about 3% in at least some embodiments.

Whereas adhesion to oil contaminated surface, shrinkage, Tg, swelling in water, and concentration of MEK soluble components are evaluated based on the binder composition including pigment, filler, and extender; other preferred properties including open time, track free time, and retained retroreflectivity of the pavement marking are based on the binder in combination with retroreflective elements.

The track-free time of the pavement marking is the time after the marking is applied before cars can drive on the marking without picking up and tracking the applied marking. The track-free time can be measured in the laboratory using ASTM D 711-89 or in the field using ASTM D713-90. The pavement marking of the invention preferably has a track free time according to ASTM D 711-89 of no greater than about 20 minutes, more preferably, no greater than about 4-10 minutes, and most preferably, no greater than about 5 minutes.

Further, the binder preferably has a sufficient open time (i.e., the length of time the composition will remain in a liquid state after application to a surface) to adequately wet out to the surface being applied to in combination with good anchoring of the retroreflective elements. The approximate open time can be assessed using one of the tests in ASTM D1640-95. Alternatively, it can be determined by spraying a coating and applying reflective elements and determining the maximum time after spraying that the beads can be applied and good bead sinking and adhesion can be obtained. The pavement marking of the present invention preferably has an open time as measured according to ASTM D1640-95 of at least about 30 seconds, and more preferably, at least about 1 minute.

For embodiments wherein the marking is intended to provide nighttime visibility, the binder composition exhibits good adhesion to the retroreflective elements. Good adhesion to surface being applied to in combination with good adhesion to the retroreflective elements contribute to the retained retroreflectivity of the pavement marking. As used herein, "retained reflectivity" is used to describe the maintained retroreflective performance of a pavement marker over its useful life. Retroreflectivity of pavement markings is typically measured by a portable instrument in the field at a fixed entrance angle and observation angle according to ASTM E 1710-95a that approximates the conditions a driver actually views a pavement marking.

Pavements markings are often used to define lanes and therefore applied as continuous lines on the edge of a lane or in dashed lines separating lanes, referred to as skips. Such markings are referred to as longitundinal markings in that the lines run parallel to the direction of travel. In actual use a relatively small percent of vehicles using the road will actually traverse these markings. Alternatively, pavement markings are also used to mark intersections in the form of stopbars, continental blocks, or symbols and legends. In actual use, a relatively large percent of vehicles using the road will actually traverse such markings, or portions of such markings.

In order to study the wear properties of a traffic marking it is common to apply the material to a road surface in a transverse pattern, that is, applied across the lanes and perpendicular to the direction of travel. In that way each vehicle will hit some portion of the test line. The wear pattern that is created may be further described as "wheel track" or the portion of the line directly in the path of the vehicle tire that receives the highest wear, or "edge line", the area nearer the boundary of the lane that is less frequently hit. By an analysis of the performance of a test marking applied in this manner it is possible to study the wear properties of a marking in an accelerated time frame to provide an estimate of actual durability.

The pavement markings formed from the composition of the present invention preferably are durable (i.e., have a useful life) for at least about 2 years, more preferably, for at least about 3 years, and most preferably, for at least about 4 years in use as longitudinal traffic markings. When retroreflective elements are used, the pavement markings exhibits a retained reflectivity of at least about 100 mcd/m$^2$/lux, and more preferably, at least about 150 mcd/m$^2$/lux, for an entrance angle of 88.76° and an observation angle or 105° throughout their useful life as longitudinal traffic markings.

The components of the binder are preferably chosen such that the pavement marking composition has a synergistic balance of properties that facilitate application of the pavement marking and or the performance thereof. For ease in application the binder is typically a low viscosity liquid (prior to reacting) yet has a high solids content. Further, the binder preferably has a broad application window (i.e. is able to be applied over a wide range of temperatures). Although many two-component compositions can be applied at relatively warm temperatures, the binder described herein can advantageously be applied at lower temperatures as well. For example, the minimum application temperature may be as low as about 7° C., 4° C., 2° C., and even −4° C.). The binder preferably has the desired viscosity profile in the absence of volatile organic components. As used herein substantially free of refers having less than about 5 wt-% volatile organic components (i.e. vapor pressure of more than 0.01 mm Hg (13.33 Pascals) at 20° C.), based on the total weight of the composition. The binder can preferably be applied with a two part static mix or airless high pressure impingement-mix application equipment. Further, the binder has a useful shelf life of at least 6 months, more preferably, at least one year, and most preferably, at least two years.

The pavement marking compositions of the present invention is typically applied directly to a traffic-bearing surface with or without a primer layer or to a substrate that is applied to the surface. This can be done using spray coating techniques. Typically, the amine component and the isocyanate component are applied using a spraying apparatus that allows the components to combine immediately prior to exiting the apparatus. For example, two-component, high pressure, airless, impingement-mixing systems can be used. Also, plural component spray equipment with a static mixer can be used.

An example of an airless, impingement mixing spray system is manufactured by Gusmer (1 Gusmer Drive, Lakewood, N.J. 08701-0110). The system will include the following components: a proportioning section which meters the two components and increases the pressure to above about 1500 psi (10.34 MPa); a heating section to raise the temperatures of the two components (preferably, independently) to control viscosity; and an impingement spray gun which combines the two components and allows mixing just prior to atomization. Other manufacturers of impingement systems include Binks Manufacturing (Chicago, Ill.) and Glas-Craft (Indianapolis, Ind.).

Another system useful for applying polyurea coatings is a system that uses a static mix tube to achieve blending of the two components. The system is similar to that of the impingement unit in that it meters, builds pressure, and optionally heats the components. However, at the spray gun, the components are combined and pumped through a length of tubing that contains elements designed to mix the components prior to atomizing. This system requires periodic flushing of the static mix tube to prevent accumulation of cured polyurea that could plug the spray gun. An example of such a spray gun is a Binks Model 43P. A convenient method and apparatus for applying relatively small quantities of two-component pavement marking compositions is described in WO03/062532 published Jul. 31, 2003. A suitable commercially available equipment that uses a static mix tube to achieve blending of the two components is available from EndiSys of Rogers, Minn.

Viscosity behavior of the each of the two components is important for two part spray-coating processes. With impingement mixing, the two parts should be as close as possible in viscosity at high shear rates to allow adequate mixing and even cure. The plural component static mix/spray system appears to be more forgiving of viscosity differences between the two components. Characterization of viscosities as functions of shear rate and temperature can help with decisions as to starting point for temperatures and pressures of the coatings in the two part spray equipment lines.

The binder compositions of the invention can be combined with various retroreflective elements. "Retroreflective elements" refers to granules, flakes, fibers, beads, etc. that reflect light either independently or when combined with a diffusely reflecting core in the direction back towards the light source.

The retroreflective elements may have virtually any size and shape, provided that the coefficient of retroreflection ($R_A$), is at least about 1 cd/lux/m$^2$ according to Procedure B of ASTM Standard E809-94a using an entrance angle of −4.0 degrees and an observation angle of 0.2 degrees. The preferred size of the retroreflective elements, particularly for pavement marking having good wet reflectivity, range from about 0.2 mm to about 10 mm and is more preferably about 0.5 mm to about 3 mm. Further, substantially spherical elements are more preferred. For the majority of wet reflective pavement marking uses, $R_A$ is typically at least about 3 cd/lux/m$^2$ (e.g. at least 5 cd/lux/m$^2$, at least 7 cd/lux/m$^2$, at least 8 cd/lux/m$^2$ and greater).

The retroreflective elements are typically applied after the binder is applied to the pavement surface. In this regard, the retroreflective elements are disposed on the exposed viewing surface after the binder has been applied whereas a filler would be (e.g. evenly) applied with and dispersed within the binder layer. This can be accomplished by flood coating the entire surface of the binder with a (slight) excess of retroreflective elements. Alternatively, the retroreflective elements can be selectively positioned for instance in a pattern. The retroreflective elements and binder may be concurrently applied and thus a portion of the retroreflective elements become incorporated into the binder layer and are at least initially not exposed. Alternatively, some of the reflective elements can be surface treated for flotation and adhesion, and the rest of the reflective elements can be treated for adhesion only. The latter would be mostly incorporated into the binder and initially unexposed and the former would be initially exposed. The retroreflective elements are typically embedded in the binder to about 20-40%, and preferably to about 30% of their diameters such that the retroreflective elements are adequately exposed. Typical coverage rates for post applied glass or glass-ceramic bead retroreflective elements is typically greater than about 4 pounds of beads per gallon (479 grams/liter) of binder, more preferably, greater than about 10 pounds per gallon (1200 grams/liter). This corresponds to greater than about 6 grams of beads per 300 $cm^2$ area, for a 15 mil (0.4 mm) thick cured film and often greater than about 15 grams of beads per 300 $cm^2$ area for a 0.4 mm thick cured film.

Since the retroreflective elements are also comprised of non-soluble (e.g. inorganic) material, after application of the retroreflective elements, the total amount of non-soluble material (e.g. pigment, filler, and retroreflective elements) is typically at least 30 wt. %. Further the total amount of non-soluble material is generally no greater than 80 wt. %.

The binder described herein can also be employed on preformed pavement marking tapes (ie. pavement marking sheets) in which the binder and retroreflective elements are generally provided on the viewing surface of the tape. On the opposing surface a backing such as acrylonitrile-butadiene polymer, polyurethane, or neoprene rubber is provided. The opposing surface of the pavement marking tape also generally comprises an adhesive (e.g., pressure sensitive, heat or solvent activated, or contact adhesive) beneath the backing. During use the adhesive is contacted to the target substrate, typically pavement.

Preferred retroreflective elements are microcrystalline microspheres. The microcrystalline microspheres may be non-vitreous, such as described in U.S. Pat. No. 4,564,556 (Lange) or the microspheres may comprise a glass-ceramic material, such as described in U.S. Pat. No. 6,461,988, also incorporated herein by reference. Typically, the retroreflective elements have a refractive index of about 1.5 to about 2.6.

The retroreflective elements are comprised of inorganic materials that are not readily susceptible to abrasion. The retroreflective elements (e.g. transparent beads) may comprise an amorphous phase, a crystalline phase, or a combination thereof. As used herein, "glass" refers to an inorganic material that is predominantly amorphous (a material having no long range order in its atomic structure evidenced by the lack of a characteristic x-ray diffraction pattern). As used herein, "ceramic" refers to an inorganic material that is predominantly crystalline and typically having a microcrystalline structure (a material having a patterned atomic structure sufficient to produce a characteristic x-ray diffraction pattern).

The retroreflective elements most widely used in pavement markings are made of soda-lime-silicate glasses. Although the durability is acceptable, the refractive index is only about 1.5, which greatly limits their retroreflective brightness. Higher-index glass retroreflective elements of improved durability that can be used herein are taught in U.S. Pat. No. 4,367,919.

The retroreflective elements are preferably ceramic (e.g. glass-ceramic). Ceramic retroreflective elements, preferably comprise zirconia, alumina, silica, titania, and mixtures thereof. Further improvements in durability and refractive index have been obtained using microcrystalline retroreflective elements as disclosed in U.S. Pat. Nos. 3,709,706; 4,166,147; 4,564,556; 4,758,469 and 4,772,511. Preferred retroreflective elements are disclosed in U.S. Pat. Nos. 4,564,556; 4,758,469 and 6,245,700; which are incorporated herein by reference. These retroreflective elements comprise at least one crystalline phase containing at least one metal oxide. These retroreflective elements also may have an amorphous phase such as silica. The retroreflective elements are resistant to scratching and chipping, are relatively hard (above 700 Knoop hardness), and are made to have a relatively high index of refraction.

Typically, for optimal retroreflective effect, the retroreflective elements have a refractive index ranging from about 1.5 to about 2.0 for optimal dry retroreflectivity, preferably ranging from about 1.5 to about 1.9. For optimal wet retroreflectivity, the retroreflective elements have a refractive index ranging from about 1.7 to about 2.4, preferably ranging from about 1.9 to about 2.4, and more preferably ranging from about 2.1 to about 2.3.

The pavement marking may comprise retroreflective elements having the same refractive index or retroreflective elements having two or more refractive indices. Further yet, the pavement marking may comprise a retroreflective element in accordance with the invention in combination with one or more retroreflective elements having the same or two or more refractive indices. Typically, retroreflective elements having a higher refractive index perform better when wet and retroreflective elements having a lower refractive index perform better when dry. When a blend of retroreflective elements having different refractive indices is used, the ratio of the higher refractive index retroreflective elements to the lower refractive index retroreflective elements is preferably about 1.05 to about 1.4, and more preferably from about 1.08 to about 1.3.

The retroreflective elements can be colored to retroreflect a variety of colors. Further, the retroreflective elements can be color matched to the marking paints in which they are embedded. Techniques to prepare colored ceramic retroreflective elements that can be used herein are described in U.S. Pat. No. 4,564,556. Colorants such as ferric nitrate (for red or orange) may be added in the amount of about 1 to about 5 weight percent of the total metal oxide present. Color may also be imparted by the interaction of two colorless compounds under certain processing conditions (e.g., $TiO_2$ and $ZrO_2$ may interact to produce a yellow color).

The pavement markings may include various other types of retroreflective elements such as those having increased vertical surfaces as are known in the art. One type of such retroreflective is made up of pellets comprising a thermoplastic core coated with ceramic beads such as described in WO 97/03814 (Bescup, et al.). As another example, all-ceramic retroreflective elements comprising an opacified ceramic core and ceramic retroreflective elements partially embedded into the core are described in U.S. Pat. Nos. 5,772,265 and 5,942,280. Many other retroreflective elements are known from for example, U.S. Pat. Nos. 3,252,376; 3,254,563; 4,983,458; 4,072,403; 4,652,172; and 5,268,789. U.S. Pat Nos. 3,043,196; 3,175,935; 3,556,637; 3,274,888; and 3,486,952; and EP Publication No. 0,322,671. Other retroreflective elements are described in U.S. application Ser. Nos. 10/761,770 and 10/761,553, both of Which were filed Jan. 21, 2004.

Various combinations of retroreflective elements may be utilized as desired.

Regardless of the type selected, the retroreflective elements (e.g. beads) are preferably treated with at least one adhesion promoting agent and/or at least one floatation agent.

Adhesion promoting agents, also referred to as coupling agents, typically comprise at least one functional group that interacts with the binder and a second functional group that interacts with the retroreflective element. A preferred adhesion promoting agents for polyureas, particularly for microcrystalline retroreflective elements (e.g. glass-ceramic beads) and inorganic core materials (e.g. sand, skid particles) are amine terminated silanes such as 3-aminopropyltriethoxysilane, commercially available from OSI Specialties, Danbury, Conn. under the trade designation "Silquest A-1100".

Suitable floatation agents include various fluorochemicals such as described in U.S. Pat. No. 3,222,204, published U.S. patent application No. 2002/0090515-A1, published Jul. 11, 2002 that claims priority to U.S. Pat. No. 6,632,508, issued Oct. 14, 2003; and U.S. Pat. No. 6,734,227, issued May 11, 2004; each of which are incorporated herein by reference. A preferred floatation agent includes polyfluoropolyether based surface treatment such as poly(hexafluoropropylene oxide) having a carboxylic acid group located on one chain terminus, commercially available from Du Pont, Wilmington, Del. under the trade designation "Krytox". "Krytox" 157 FS is available in three relatively broad molecular weight ranges, 2500 g/mole (FSL), 3500-4000 g/mole (FSM) and 7000-7500 g/mole (FSH), respectively for the low, medium and high molecular weights. The low and medium molecular weight grades are preferred for aqueous delivery of the surface treatment. Other preferred floatation agents are described in WO 01/30873 (e.g. Example 16).

Pavement markings often further comprise skid-resistant particles to reduce slipping by pedestrians, bicycles, and motor vehicles. The skid-resistant particles can be, for example, ceramics such as quartz, aluminum oxide, silicon carbide or other abrasive media.

Objects and advantages of the invention are further illustrated by the following examples, but the particular materials and amounts thereof recited in the examples, as well as other conditions and details, should not be construed to unduly limit the invention. All percentages and ratios herein are by weight unless otherwise specified.

EXAMPLES

The following materials were used to prepare examples of the present invention.

Components for Preparation of Amine Component

| Ingredient | Description | Supplier | Location |
|---|---|---|---|
| Disperbyk 111 | Dispersant additive | Byk-Chemie USA | Wallingford, CT |
| Desmophen NH 1220 | Aspartic ester diamine polyamine | Bayer Corp. | Pittsburgh, PA |
| Desmophen NH 1420 | Aspartic ester diamine polyamine | Bayer Corp. | Pittsburgh, PA |
| Jeffamine XTJ-510 | Polyoxyalkylene diamine polyamine | Huntsman Corp. | Houston, TX |
| Ti-Pure R960 TiO2 | Titanium dioxide pigment | Dupont Company | Wilmington, DE |
| Omyacarb 6 (calcium carbonate) | Calcium carbonate filler | Omya Inc. | Proctor, VT |

Components for Preparation of Modified Isocyanate Component

| Ingredient | Description | Supplier | Location |
|---|---|---|---|
| Tolonate HDT-LV | Polyisocyanate, 23% NCO | Rhodia Corp. | Cranbury, NJ |
| Desmodur N-3600 | Polyisocyanate 23% NCO | Bayer Corp. | Pittsburgh, PA |
| Tone 0200 | Polycaprolactone Diol Mn = 530 g/mole | Dow Chemical Co. | Midland, MI |
| Priplast 3193 | Dimer Acid-based Polyol Mn = 1000 g/mole | Uniqema | Newcastle, DE |
| Pripol 2033 | Dimer Diol Mn = 560 g/mole | Uniqema | Newcastle, DE |
| Priplast 3192 | Dimer Acid-based Polyol Mn = 2000 g/mole | Uniqema | Newcastle, DE |
| Dibutyltin dilaurate | Catalyst | Aldrich Chemical Co. | Milwaukee, WI |
| Retroreflective Elements | 60/40 sinker/floater blend of AASHTO M 247 Type I gradation 1.5 index glass beads | Swarco Industries | Columbia, TN |
| LPM 1270I White Composite Reflective Elements | A component of Stamark Liquid Pavement Marking Series 1200. | 3M Company | St. Paul, MN |

Preparation of the Amine Component

Step 1: The amount of Desmophen NH-1420 as indicated in forthcoming Table 3 and dispersant (i.e. Disperbyk 111) were charged into a 1000 ml plastic beaker. The components were mixed at low shear using a Cowles-type impeller blade (1000-2000 rpm) for 2 minutes.

Step 2: The amount of $TiO_2$ pigment as indicated in forthcoming Table 3 was slowly added while hand mixing. After all of the $TiO_2$ was added, the mixture was further hand mixed until the $TiO_2$ was wetted out and the mixture had a uniform consistency with no clumps. The mixture was then mixed at high shear using a Cowles-type impeller blade (5000-6000 rpm) for 5 minutes.

Step 3: The amount of $CaCO_3$ as indicated in forthcoming Table 3 was slowly added and hand-mixed as described in Step 2. If the viscosity became too high, some of the Desmophen NH-1220 was added to reduce the viscosity and aid the mixing.

Step 4: The mixture was mixed using a Cowles-type impeller blade for 15 minutes at high shear (5000-6000 rpm) to disperse agglomerated $TiO_2$ and $CaCO_3$. The temperature was monitored and if it increased to more than 140° F. (60° C.), the rpm of the impeller blade was reduced or some of the Desmophen NH-1220 was added to reduce the viscosity. A Hegman-type grind gauge was used to evaluate the quality of dispersion. If a reading of less than 7.0 on the PC grind scale was attained, additional grinding was employed until a reading of 7.0 or more on the PC grind scale was obtained.

Step 5: The remaining amount of NH-1220 (less any that was added during steps 3 and 4 and totaling the amount indicated in forthcoming Table 3) and the amount of XTJ-510 as indicated in forthcoming Table 3 were then added followed by low shear mixing (at 2000 rpm) for approximately 5 minutes to ensure uniform mixing.

The following Table 1 sets forth the amounts (in grams) of each component utilized to prepare the amine component.

TABLE 1

| | Example | | | | | |
|---|---|---|---|---|---|---|
| | 1 | 2 | 3 | 4 | 5 | 6 |
| Disperbyk 111 | 0.75 | 0.30 | 0.53 | 0.14 | 0.14 | 1.88 |
| NH1220 | 28.7 | 34.2 | 31.1 | 35.7 | 35.7 | 39.7 |
| NH1420 | 57.4 | 68.4 | 62.2 | 71.4 | 71.4 | 79.5 |
| XTJ-510 | 85.5 | 92.5 | 88.5 | 94.5 | 94.5 | 0.0 |
| $TiO_2$ | 63.3 | 44.4 | 45.1 | 20.6 | 20.6 | 131.5 |
| Omyacarb 6 | 46.4 | 0.0 | 33.1 | 0 | 0 | 144.8 |

Preparation of the Modified Isocyanate Component

For each modified isocyanate A-D, 80 grams of the respective polyol was charged to a round-bottomed flask and heated at 100° C. under vacuum for 1 hour. The reaction was cooled to 60° C. and brought to atmospheric pressure under dry nitrogen. Tolonate HDT-LV or Desmodur N-3600 (320 g) was added followed by 0.05 g dibutyltin dilaurate. The reaction was heated to 80° C. and held for 90 minutes, then cooled and packaged and sealed under a dry nitrogen atmosphere.

The following Table 2 sets forth the amounts (in grams) of each component utilized to prepare the modified isocyanate component.

TABLE 2

| Modified Isocyanate Designation | Isocyanate | Polyol | % Polyol | Calculated NCO Eq. Wt. | Relative oil compatibility |
|---|---|---|---|---|---|
| A | Tolonate HDT-LV | Tone 0200 | 20 | 290 | Lowest |
| B | Tolonate HDT-LV | Priplast 3193 | 20 | 246 | Intermediate |
| C | Tolonate HDT-LV | Pripol 2033 | 20 | 269 | Intermediate |
| D | Tolonate HDT-LV | Priplast 3192 | 20 | 236 | Highest |
| E | Desmodur N-3600 | Priplast 3192 | 20 | 236 | Highest |

The following Table 3 sets forth the amounts (as weight percentages) of each component of the two-component compositions of the invention.

TABLE 3

| | Example | | | | | |
|---|---|---|---|---|---|---|
| | 1 | 2 | 3 | 4 | 5 | 6 |
| Amine Component | | | | | | |
| Disperbyk 111 | 0.19 | 0.09 | 0.14 | 0.04 | 0.04 | 0.37 |
| NH1220 | 7.26 | 9.68 | 8.31 | 10.63 | 10.63 | 7.78 |
| NH1420 | 14.52 | 19.35 | 16.63 | 21.27 | 21.27 | 15.56 |
| XTJ-510 | 21.62 | 26.20 | 23.68 | 28.15 | 28.15 | 0.0 |
| TiO2 | 16.00 | 12.59 | 12.06 | 6.14 | 6.14 | 25.75 |
| Omyacarb 6 | 11.74 | 0.00 | 8.85 | 0.00 | 0.00 | 28.35 |
| Isocyanate Component | | | | | | |
| Modified isocyanate A | 28.68 | | | | | |
| Modified isocyanate B | | 32.10 | | | | |
| Modified isocyanate C | | | 30.32 | | | |
| Modified isocyanate D | | | | 33.77 | | |
| Modified isocyanate E | | | | | 33.77 | 22.2 |
| Isocyanate:amine stoichiometric ratio | 1.05 | 1.05 | 1.05 | 1.05 | 1.05 | 1.05 |
| Amine:isocyanate volume ratio | 2.0:1.0 | 2.0:1.0 | 2.0:1.0 | 2.0:1.0 | 2.0:1.0 | 2.0:1.0 |
| Wt % XTJ-510 | 30 | 30 | 30 | 30 | 30 | 0.0 |
| NH 1220/NH 1420 wt. ratio | 0.5 | 0.5 | 0.5 | 0.5 | 0.5 | 0.5 |

Testing

Coatings of the above examples were prepared by spraying using 400 mil 2:1 mixing cartridges, 160-24 static mix tubes from Tah Industries (Robbinsville, N.J.), and a sprayer that used a static mix tube to achieve blending of the two components and was capable of introducing air and spraying the mixture (such as described in WO03/062532 published Jul. 31, 2003).

Approximately 15-20 mils thick coatings of examples 1-4 were sprayed onto a smooth concrete surface that had been previously contaminated with motor oil by applying an excess of 5W30 motor oil, allowing it to sit, removing the excess with a paper towel, and then allowing it to sit for one day before coating. The coatings were applied onto the oil-contaminated surface using an adhesive-backed stencil with ½" diameter circles to make coatings that were ½" circles. In addition to spraying onto the contaminated concrete, coatings were also applied onto a release paper to allow for physical property testing.

Figure 1:
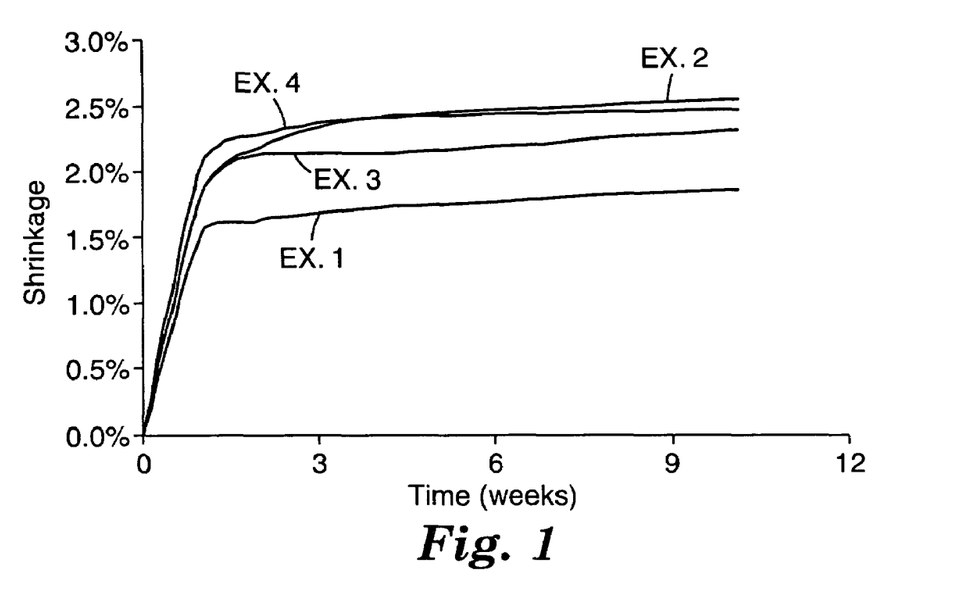
FIG. 1 is a graph depicting the shrinkage of compositions of the invention at 150° F. (65° C.) as a function of time.

Shrinkage of the coatings was measured using a laser interferometer and a ball slide stage. Samples of each coating were cut and removed from the release paper. Each sample was approximately 1 in wide by 10 in long. Each sample was tested by accurately measuring the initial sample length and then storing the sample in a 150° F. oven and repeating the measurement after one, two, and four weeks of storage at 150° F. The amount of shrinkage is given by shrinkage=1−L/L$_0$, where L and L$_0$ are the length after a given time and the initial length respectively. The results are depicted in FIG. 1.

MEK Soak was performed by removing approximately 0.4 to 0.8 grams of the coating from the release liner, encasing the sample in a fine mesh fiberglass screen and immersing the in sample in MEK and measuring the amount of MEK soluble material after one week. The results are reported as follows:

| Example | Screen Weight (gms) | Screen + Sample Weight (gms) | Sample Weight (gms) | Screen + Sample after Extraction Weight (gms) | Sample after Extraction Weight (gms) | % Soluble |
|---|---|---|---|---|---|---|
| 1 | 2.6400 | 3.4371 | 0.7971 | 3.4087 | 0.7687 | 3.6% |
| 2 | 2.6418 | 3.4474 | 0.8056 | 3.4258 | 0.7840 | 2.7% |
| 3 | 2.6258 | 3.0509 | 0.4251 | 3.0398 | 0.4140 | 2.6% |
| 4 | 2.6603 | 3.3001 | 0.6398 | 3.2788 | 0.6185 | 3.3% |

Figure 3:
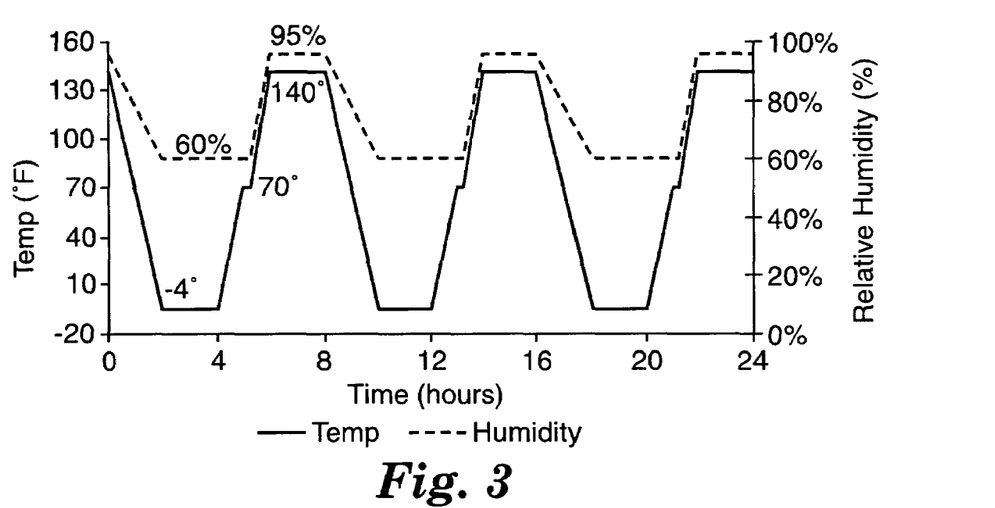
FIG. 3 is a graph depicting the temperature and humidity cycling for the adhesion test.

Seven samples of each of the exemplified coatings of the invention were subjected to conditioning wherein the temperature was cycled between −4° F. and 140° F. at a rate of 72° F./hour concurrently with the humidity being cycled between 60% relative humidity and 95% relative humidity at a rate of 15% relative humidity/hour wherein the each minimum and maximum condition was held constant for 2 hours as depicted in FIG. 3.

The samples were examined for evidence of delamination after various intervals of time. Curling or lifting of any portion of the coating was considered a failure. The results are reported in following Table 4.

| Example | Pass/Total after 24 hours | Pass/Total after 192 hours | Pass/Total after 696 hours | Pass/Total after 1824 hours |
|---|---|---|---|---|
| 1 | 7/7 | 5/7 | 3/7 | 2/7 |
| 2 | 7/7 | 7/7 | 7/7 | 6/7 |
| 3 | 7/7 | 7/7 | 7/7 | 7/7 |
| 4 | 7/7 | 7/7 | 7/7 | 7/7 |

Examples 2-4 exhibited better performance on an oil-contaminated surface in comparison to Example 1, prepared from the modified isocyanate that was prepared from the polyol with the least hydrophobicity.

Water soak testing was performed by removing approximately 1 g of the coating from the release liner and immersing the sample in deionized water and measuring the amount of water absorbed and the amount of soluble material after one week with the results reported as follows:

| Example | Initial Sample Weight (gms) | Swollen Sample Weight (gms) | Dried Sample Weight (gms) | % Swelling | % Soluble |
|---|---|---|---|---|---|
| 1 | 0.9225 | 0.9675 | 0.9040 | 4.9% | 2.0% |
| 2 | 0.8129 | 0.8347 | 0.7961 | 2.7% | 2.1% |
| 3 | 0.5639 | 0.5828 | 0.5539 | 3.4% | 1.8% |
| 4 | 0.7091 | 0.725 | 0.6923 | 2.2% | 2.4% |

All of the examples had less than 5% swelling and less than 2.5% water soluble components.

All of the samples had essentially the same level of MEK solubles (2-4%), indicating similar levels of crosslinking—that is, use of the modified isocyanates did not negatively effect the degree of cure of the systems.

Figure 2:
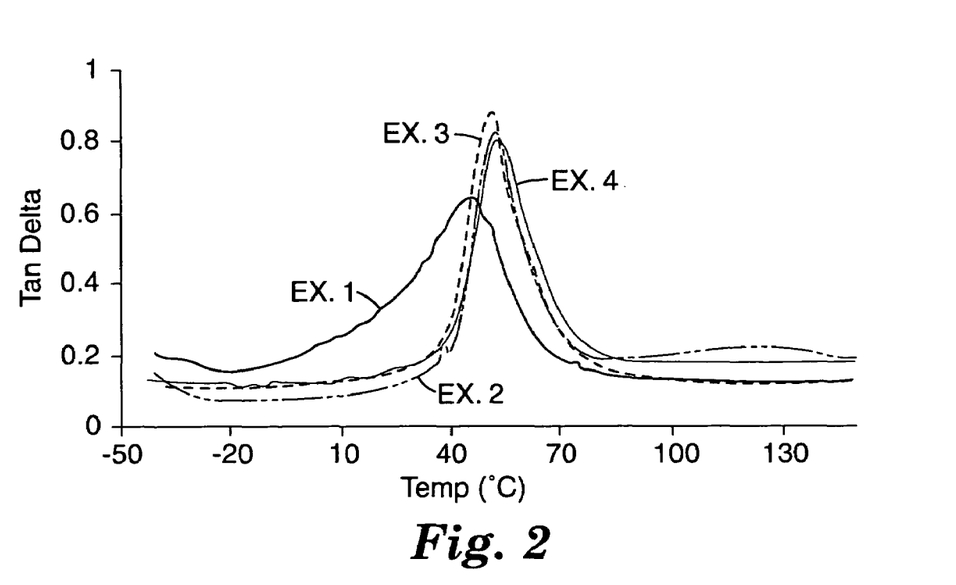
FIG. 2 is a graph depicting dynamic mechanical analysis temperature sweeps of compositions of the invention.

DMA analysis of the coatings was performed using a Dynamic Mechanical Analyzer commercially available from Perkin-Elmer Corporation, Norwalk, Conn. under the trade designation "Model DMA-7e." Samples were cut and removed from the release paper. Each sample was approximately 5.5 mm wide by 2.5 cm long. The sample was tested using a dynamic load of 100 mN/mm$^2$ (1.0×10$^5$ N/m$^2$) and a static load of 110 mN/mm$^2$ (1.1×10$^5$ N/m$^2$). During the test, the temperature was increased from about −50° C. to 150° C. at a rate of 1° C. per minute. The Tg (maximum of tan delta) was determined for each sample. All of the samples had similar Tgs except for Example 1, which exhibited a slightly lower Tg and a broader transition. The temperature sweeps are depicted in FIG. 2. The Tg of each of the examples was as follows:

| Example | Tg° C. |
|---|---|
| 1 | 47 |
| 2 | 53 |
| 3 | 51 |
| 4 | 52 |

Coatings of examples 5 and 6 were sprayed onto a flat cardboard surface and then reflective elements were hand applied using the quantities given in the below table where the quantities are the weights (in grams) applied to a 4"×18" area (72 in$^2$ or 465 cm$^2$). The reflective elements were applied within approximately 15-45 seconds after the coatings were sprayed. The larger elements (3M) were applied first, and the smaller elements (Swarco) were applied second. The retroreflectivity of the examples was measured using an LTL 2000 Retrometer manufactured by Delta using an entrance angle of 88.76 degrees and an observation angle of 1.05 degrees to simulate a driver viewing distance of 30 meters. The results of the testing are given in the below table. In addition, the adhesion of the elements was evaluated by viewing the elements under a microscope and picking at them with a metal probe. All of the elements in all of the examples appeared to exhibit good adhesion as judged by difficulty of removal and evidence of some of the binder remaining attached to at least part of the removed elements, and occasional fracture or crushing of the elements that occurred before removal could be accomplished.

|  | Example | | |
| --- | --- | --- | --- |
|  | 7 | 8 | 9 |
| Composition from Table 3 | Ex. 5 | Ex. 5 | Ex. 6 |
| Reflective element (gms/72 in$^2$) |  |  |  |
| 3M-LPM 1200 elements | 7.5 | 7.5 |  |
| Swarco 60/40 glass beads | 15 | 15 | 15 |
| Retroreflectivity (mcd/m$^2$/lux) | 435 | 985 | 183 |

What is claimed is:

1. A pavement marking composition comprising:
a binder comprising
   a first component comprising the reaction product of an excess of at least one polyisocyanate and at least one hydroxyl group-containing material that comprises at least 6 carbon atoms for each oxygen atom, and
   a second component comprising at least one polyamine;
material selected from the group of fillers, extenders, pigments and combinations thereof and retroreflective elements.

2. The pavement marking composition of claim 1 wherein the hydroxyl group-containing material is a polyester polyol prepared from the group consisting of dimer acid, dimer diol, and mixtures thereof.

3. The pavement marking composition of claim 2 wherein the hydroxyl group-containing material is a diol.

4. The pavement marking composition of claim 1 wherein the hydroxyl group-containing material comprises a number average molecular weight of at least 300 g/mole.

5. The pavement marking composition of claim 1 wherein the hydroxyl group-containing material comprises about 5 wt-% to about 50 wt-% of the first component.

6. The pavement marking composition of claim 1 wherein the polyisocyanate comprises isocyanurate groups.

7. The pavement marking composition of claim 1 wherein the polyamine is a secondary amine.

8. The pavement marking composition of claim 1 wherein the polyamine is an aspartic ester amine.

9. The pavement marking composition of claim 1 wherein the first component and second component are reacted at a stoichiometric ratio of about 1:1.

10. The pavement marking composition of claim 1 wherein the binder comprises at least about 5 wt-% of material selected from the group of fillers, extenders, pigments.

11. The pavement marking composition of claim 10 wherein the binder comprises at least about 15 wt-% of material selected from the group of fillers, extenders, pigments.

12. The pavement marking of composition claim 10 wherein the binder comprises at least about 30 wt-% of material selected from the group of fillers, extenders, pigments.

13. The pavement marking of claim 10 wherein the composition comprises at least about 45 wt-% of material selected from the group consisting of fillers, extenders, pigments.

14. The pavement marking composition of claim 1 wherein the filler comprises hollow glass microspheres.

15. The pavement marking composition of claim 10 wherein the binder exhibits a shrinkage of less than 5%.

16. The pavement marking composition of claim 10 wherein the binder exhibits good adhesion to oil contaminated surfaces.

17. The pavement marking composition of claim 1 wherein the retroreflective elements comprise ceramic microspheres, ceramic reflective elements, and combinations thereof.

18. The pavement marking composition of claim 1 wherein the marking is substantially free of volatile organic components.

19. A traffic-bearing surface comprising the cured pavement marking composition of claim 1.

20. A preformed pavement marking tape comprising a substrate and the cured pavement marking composition of claim 1.

21. A method of marking a traffic-bearing surface comprising:
providing a two-component binder comprising
   a first component comprising the reaction product of an excess of at least one polyisocyanate and at least one hydroxy group-containing material that comprises at least 6 carbon atoms for each oxygen atom, and
   a second component comprising at least one polyamine, wherein at least one component comprises material selected from the group of fillers, extenders, pigments and combinations thereof;
combining the first component and second component of the binder; and
applying the binder onto a traffic bearing surface.

22. The method of claim 21 further comprising applying retroreflective elements to the binder.

23. The method of claim 21 wherein the binder is applied by spraying.

24. A coating composition comprising:
a binder comprising
   a first component comprising the reaction product of an excess of at least one polyisocyanate and at least one hydroxy group-containing material that comprises at least 6 carbon atoms for each oxygen atom, and
   a second component comprising at least one polyamine;
and about 15 wt-% to about 45 wt-% of material selected from the group of fillers, extenders, pigments and combinations thereof.

25. The coating composition of claim 24 wherein the composition comprises retroreflective elements.

* * * * *

UNITED STATES PATENT AND TRADEMARK OFFICE
CERTIFICATE OF CORRECTION

| | |
|---|---|
| PATENT NO. | : 7,342,056 B2 |
| APPLICATION NO. | : 10/870396 |
| DATED | : March 11, 2008 |
| INVENTOR(S) | : Suman K. Patel |

It is certified that error appears in the above-identified patent and that said Letters Patent is hereby corrected as shown below:

Cover Page
Col. 2, Other Publications, Delete "Elasomer" and insert -- Elastomer --, therefor.

Column 5
Line 32, Delete "isocyantate" and insert -- isocyanate --, therefor.
Line 39, Delete "doil))," and insert -- diol), --, therefor.

Column 7
Line 31, Delete "stoichimetric" and insert -- stoichiometric --, therefor.

Column 10
Line 62, Delete "longitundinal" and insert -- longitudinal --, therefor.

Column 11
Line 30, Delete "and or" and insert -- and/or --, therefor.

Column 14
Line 56, Delete "Pat" and insert -- Pat. --, therefor.
Line 59, Delete "10/761,553," and insert -- 10/761,533, --, therefor.
Line 60, Delete "Which" and insert -- which --, therefor.

Column 15
Line 63, Delete "TiO2" and insert -- $TiO_2$ --, therefor.

UNITED STATES PATENT AND TRADEMARK OFFICE
CERTIFICATE OF CORRECTION

PATENT NO. : 7,342,056 B2
APPLICATION NO. : 10/870396
DATED : March 11, 2008
INVENTOR(S) : Suman K. Patel

It is certified that error appears in the above-identified patent and that said Letters Patent is hereby corrected as shown below:

<u>Column 17-18</u>
Table 3, Line 8, Delete "TiO2" and insert -- $TiO_2$ --, therefor.

<u>Column 21</u>
Line 23, In Claim 1, delete "thereof" and insert -- thereof; --, therefor.

Signed and Sealed this

Twenty-ninth Day of July, 2008

JON W. DUDAS
*Director of the United States Patent and Trademark Office*